United States Patent
Schulthess et al.

[11] 3,774,195
[45] Nov. 20, 1973

[54] LIQUID CRYSTAL DISPLAY DEVICE

[75] Inventors: Peter U. Schulthess, Zurich; Peter Wild, Wettingen, both of Switzerland

[73] Assignee: Aktiengesellschaft Brown, Boveri & Cie, Baden, Switzerland

[22] Filed: Feb. 7, 1972

[21] Appl. No.: 224,039

[30] Foreign Application Priority Data
Feb. 15, 1971 Switzerland.......................... 2230/71

[52] U.S. Cl.............. 340/324 R, 324/122, 340/172, 350/160 LC
[51] Int. Cl................................................ G02f 1/18
[58] Field of Search.................... 340/324 R, 324 M, 340/172, 336; 350/160 R, 160 LC; 324/121, 122

[56] References Cited
UNITED STATES PATENTS
| | | | |
|---|---|---|---|
| 3,667,039 | 5/1972 | Garfein et al. | 340/324 R |
| 3,517,258 | 6/1970 | Lynch | 340/324 R |
| 3,322,485 | 5/1967 | Williams | 340/324 R |

OTHER PUBLICATIONS
Electronically Scanned Analog Liquid Crystal Displays by R. A. Soref; Applied Optics; Vol. 9, No. 6; June, 1970; pp. 1323–1329.

*Primary Examiner*—John W. Caldwell
*Assistant Examiner*—Marshall M. Curtis
*Attorney*—W. G. Fasse

[57] ABSTRACT

An optical film, for example, of the so called nematic liquid crystal type is sandwiched between two electrodes forming a device of which at least one electrode is segmented. One electrode provides an equipotential plane while the other electrode has a surface resistance which provides a potential gradient therealong. The segmented electrodes are connected to a voltage supply by series or shunt rectifiers. The device may be used, for example, for indicating a measured value such as a voltage by a visible line or bar which represents an interface or a boundary between differing optical states and which bar or line travels through the device along a scale which thus represents direct readings of the measured value.

8 Claims, 5 Drawing Figures

LIQUID CRYSTAL DISPLAY DEVICE

BACKGROUND OF THE INVENTION

The present invention relates to an arrangement for locally modifying the optical properties of an indicating or display medium extending between at least two electrodes. A control voltage is applied across the electrodes for modifying said properties.

R. A. Soref; Applied Optics; Volume 9, Number 6; June, 1970, in the article "Electronically Scanned Analog Liquid Crystal Displays," describes an arrangement in which an indicating medium, preferably a so called nematic liquid crystal, extends in a plane between two electrodes at least one of which is transparent and of which one constitutes an electrical equipotential surface while the other has a surface resistance such that along it a well-defined potential gradient can be produced.

In one embodiment of the above article, a voltage is applied to the electrode operated as the equipotential surface. This applied voltage corresponds to the sum of the threshold voltage for the optical activation of the indicating medium and the voltage to be measured. A potential gradient is produced along the other electrode having a predetermined surface resistance, by applying different potentials to the terminals of the other electrode. A local voltage distribution is produced in the sandwich or indicating medium by a suitable choice of the voltages between the electrodes. When the voltage to be measured is zero said local voltage distribution decreases linearly from a threshold value. For voltage values of levels within a predetermined measurement range, said local voltage distribution is displaced parallel to itself in a direction perpendicular to the indication coordinate, so that the interface defined by the location of attainment of the threshold voltage, that is to say the interface or boundary between two zones of differing optical state migrates proportionally to the values of the measured voltage along the indication coordinate. The measured voltage can in this way be displayed by the length of a bright "bar" or line.

In order to secure a sharp transition at said interface or boundary between the two zones of differing optical state, said potential gradient along said electrode must be as steep as possible. If, however, the voltage transversely across the electrode exhibiting the potential gradient, is more than twice the threshold value which controls the optical activation, e.g. the dynamic scattering of the indicating medium, then, depending upon the magnitude of the applied voltage to be measured, two optically activated zones with an intermediate unactivated zone, may occur or develop. Said unactivated zone is unsuitable as an indicating bar, because of the size of its width in comparison to the scale length.

OBJECTS OF THE INVENTION

In view of the above it is the aim of the invention to achieve the following objects singly or in combination:

to avoid the drawback of the prior art in a measuring device which indicates a measured value as a boundary or interface between two different optical states;

to assure a sharp and crisp interface between said two differing optical states;

to suppress one of the above mentioned two optically activated zones, whereby said suppression should be accomplished independently of the size of the applied potential gradient so that the remaining single interface between the activated and non-activated zone may serve as indication mark;

to provide a measuring device of the described type which will transform an analog input value into a quasi-quantized output value as it measures the input value; and to provide a measuring device of the described type which will indicate an analog value as such.

SUMMARY OF THE INVENTION

According to the invention there is provided an arrangement for the localized modification of the optical properties of an indicating medium sandwiched between at least two electrodes by means of a control voltage applied across the electrodes, wherein at least one of said electrodes comprises a plurality of segments, and wherein at least one rectifier element is provided for each of the segments of one of said electrodes.

BRIEF FIGURE DESCRIPTION

In order that the invention may be clearly understood, it will now be described by way of example with reference to the accompanying drawings, wherein.

DETAILED DESCRIPTION OF EXAMPLE EMBODIMENTS

Figure 1:
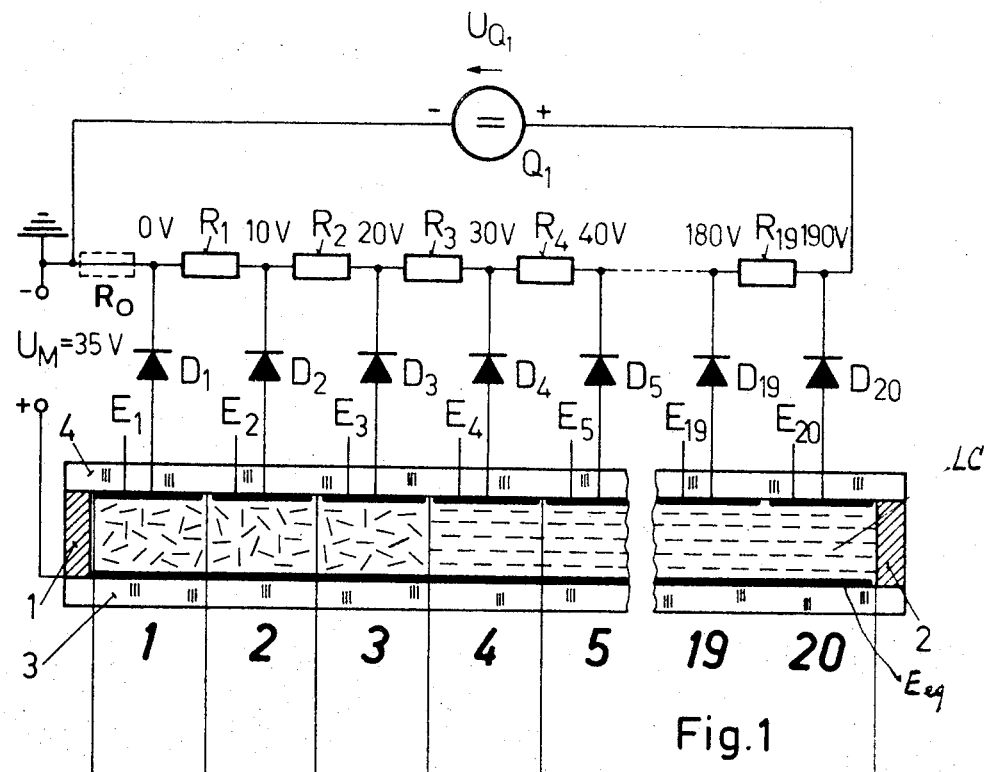
FIG. 1 illustrates a sectional view of a first embodiment of an indicating element according to the invention.

In the arrangement of FIG. 1 which shows a sectional view through an indicating element as well as its external circuitry, an indicating medium LC is disposed between two mutually parallel glass plates 3, 4 separated from each other by spacers 1, 2 located at the peripheries of said glass plates. The surface of the lower glass plate 3 which faces towards the indicating medium is provided with a flat electrode referred to as the equipotential electrode $E_{eq}$. This electrode $E_{eq}$ may be produced in any suitable known manner, e.g. by the deposition of a metal coating from the vaporized phase of said metal. In order to produce a transparent electrode, which may be advantageous for certain purposes, a tin-dioxide ($SnO_2$) film may be applied, for example as described in the magazine "Naturforschung," vol. 9a, pages 508 to 511; 1954.

The surface of the upper glass plate 4 which faces the indicating medium LC is also provided with an electrode. However, this electrode is segmented. To this end, this electrode is subdivided into a plurality of electrode elements $E_1, \ldots E_{20}$ which cover the top glass plate 4 in the form of bands. The electrode elements are electrically isolated from one another and connected with the outside of the sandwich structure underneath the respective peripheral spacers which are not visible in the sectional illustration. The electrode elements may be produced in the same way as the equipotential electrode $E_{eq}$ by a kind of vaporization deposition process which may use masking means if necessary. These processes are well known in the art.

The indicating medium LC may comprise, for example, a so called liquid crystal, preferably a nematic liquid crystal for example MBBA (4-methoxy-4'-n-butyl-benzylidene-aniline or p-(p-aethoxyphenylazo)-phenylheptanoate.

Each electrode element $E_1, \ldots E_{20}$ is connected to a diode $D_1, \ldots D_{20}$ respectively. Each diode is connected with its anode to the respective electrode element $E_1$ to $D_1$, $E_2$ to $D_2$, etc., etc. The cathodes of the diodes are connected to respective junction points along a series of nineteen resistors $R_1, \ldots R_{19}$ all of which are of equal value, thus $R_1 = R_2 = \ldots = R_{19}$. One end of the series of resistors and the cathode of diode $D_1$ is connected to the negative pole while the other end with the cathode of the diode $D_{20}$ is connected to the positive pole of a d.c. voltage source $Q_1$. The voltage $U_M$ to be measured is applied between equipotential electrode $E_{eq}$ and said one end of the resistor series. If the voltage $U_M$ is measured relative to earth or ground potential then this end of the resistor series and therefore also the negative pole of the d.c. voltage source $Q_1$ may be connected to earth or ground.

Figure 2:
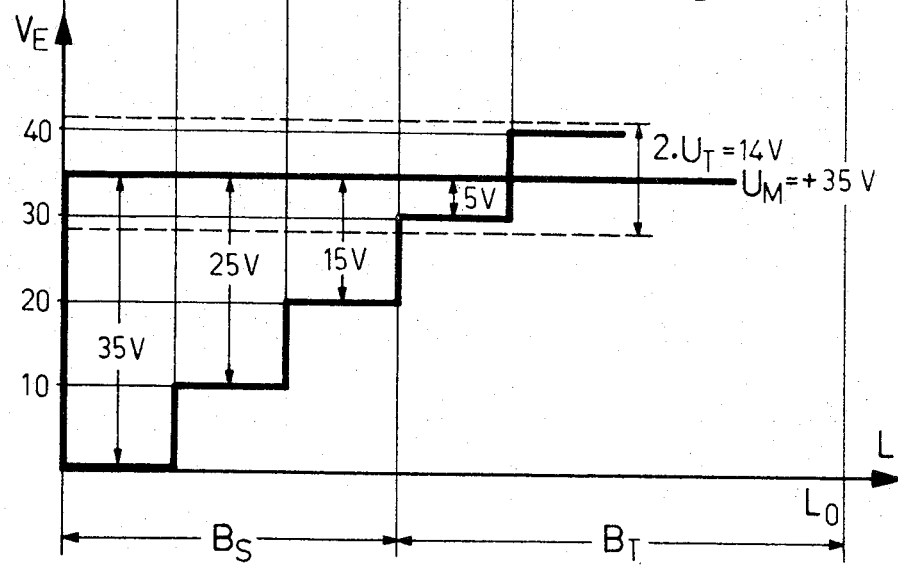
FIG. 2 is a diagram for explaining the mode of operation of the arrangement shown in FIG. 1.

The diagram of FIG. 2 illustrates the potential characteristic of the electrode elements $E_1, \ldots$ of the arrangement shown in FIG. 1. Along the abscissa there is plotted the indication coordinate L, and the ordinate represents the electrical potential $V_E$ relative to ground potential. As shown in FIG. 1, $U_{Q1} = 190$ V, $R_1 = R_2 = \ldots R_{19}$, the electrode elements all have the same width in the lengthwise direction L, and the spacing between two neighboring electrode elements is made as small as possible. With this arrangement a staircase potential characteristic of constant stepwidth and height is produced. The potential characteristic is indicated in the diagram of FIG. 2 by the full-line staircase curve.

For describing the mode of operation of the arrangement shown in FIG. 1 let it be assumed initially that the diodes $D_1, \ldots D_{20}$ which are provided for the electrode elements $E_1, \ldots E_{20}$ and virtually connected in series with the indicating medium LC, are shunted. A voltage $U_M$ to be measured, for example + 35 Volts, is applied between the equipotential electrode $E_{eq}$ and the grounded input terminal. Thus, the equipotential electrode is at a potential of + 35 Volts relative to ground. The electrode elements are at the potentials marked in FIG. 1: $E_1$ at 0 volts, $E_2$ at 10 volts ..., $E_{20}$ at 190 volts. The indicating medium exhibits a dynamic scattering effect wherever the absolute value of the potential difference between an electrode element and the equipotential electrode is greater than the threshold value $U_T$ of the dynamic scattering phenomenon. Let it be assumed that this threshold value $R_T$ is, for example, 7 volts. The optical properties of the liquid crystal LC in the space between the equipotential electrode $E_{eq}$ and the electrode elements $E_1$, $E_2$, $E_3$ on the one hand, and in the space between the equipotential electrode $E_{eq}$ and the electrode elements $E_6$, $E_7$, ... $E_{20}$, on the other hand change in such a fashion that, for example, these spaces light up whereas the space between the electrode elements $E_4$, $E_5$ and the equipotential electrode $E_{eq}$ remains dark. Thus, an indication mark, in the form of a dark or transparent zone, is produced, the length of which is equivalent to the width of two electrode elements considered in the longitudinal direction L. The last mentioned zone is not particularly well suited for use as an indication mark. It is desirable to suppress one of the two scatter zones, e.g. the righthand zone (not shown) and to use the remaining interface or boundary between the lefthand scatter zone $B_S$ and the non-scattering transparent zone $B_T$ as the indication mark. In accordance with the invention this can be achieved in that the individual junctions in the resistor series, including its two ends, are connected not directly but across rectifier elements, for example diodes $D_1, \ldots D_{20}$, with the corresponding electrode elements $E_1, \ldots E_{20}$. The diodes are to be connected in the same sense throughout, i.e. the anodes or the cathodes of all of them are connected to the electrode elements.

The current through the resistor series $R_1, \ldots R_{19}$ should be of such magnitude that the currents through the indicating medium LC and the diodes, do not distort the potential distribution across the resistor series. The reverse currents of the diodes used may, in the zone corresponding to each individual diode, produce only such voltage drops across the indicating medium which are below the threshold value $U_T$. In other words, the residual current through the diodes operated in the reverse direction should not produce any dynamic scattering in the indicating medium. In order to have an idea of the resistance range of a thin liquid crystal film of 10 to 100$\mu$ thickness, it may be noted that typical values are in the order of $10^6$ Ohm/cm$^2$.

Thus, the current for the optical activation of the liquid crystal is allowed to pass in one direction only through these diodes connected in series with the liquid crystal. In the arrangement shown in FIG. 1 this thus means that the current flows from the equipotential electrode $E_{eq}$ to electrode elements $E_1$, $E_2$, $E_3$, $E_4$. The diodes $D_5$ to $D_{20}$ block any possible current which might be introduced by the potential difference between equipotential electrode $E_{eq}$ and the corresponding junctions in the resistor series.

The polarities of the voltages and of the diodes, as indicated in FIG. 1, suppress the "second" scatter zone which is located to the right of the transparent zone. For example, the "first" scatter zone could equally well be suppressed by reversing the polarity of all of the diodes $D_1$ to $D_{20}$. Then, the interface or boundary between the transparent zone and the scatter zone may be used as an indication mark.

The proposed arrangement makes it possible to measure d.c. voltages and to display the measured value visually in the form of a bar. Conveniently, each electrode element will be assigned a specific scale value as indicated, for example, in FIG. 1. Then, the relationships collated in the form of a table hereinafter, are obtained between the applied voltage $U_M$ to be measured and the scale values, if the starting point adopted is that of a threshold voltage $U_T = 7$ volts for the dynamic scattering phenomenon:

$$\begin{cases} \text{Scale Value "1":} & +7V < U_M \leq +17V \\ \text{Scale Value "2":} & +17V < U_M \leq +27V \\ \phantom{\text{Scale Value}} \cdots & \phantom{+7V} \cdots \\ \text{Scale Value "20":} & +197V < U_M \leq +207V \text{ and above} \end{cases}$$

The table illustrates how the conversion of an analog input value into a digital output value in the form of the scale reading can be achieved with the indicating element according to FIG. 1. The resolution in the case of the 20 segments employed in FIG. 1 is 5 percent, i.e. it is relatively poor in comparison with that of conventional analog-to-digital converters. However, the resolution can be improved if a higher voltage $U_{Q1}$ is used and the number of segments or electrode elements is increased.

A controlling factor in determining what resolution can be obtained for a given voltage $U_{Q1}$ is the voltage range within which the indicating medium will change from the transparent to the scattering condition. There is no point in producing any finer step formation in the staircase curve of the potential gradient (FIG. 2), than would correspond to the transition range of the contrast curve of the indicating medium.

From the above table it may be further seen that there is a kind of linear relationship between the measured voltage $U_M$ and the scale reading. This makes it possible to shift the zero point of the indication or reading in an arbitrary manner. This can be done in two ways. The first possibility is to superimpose a constant bias voltage, e.g. −7 volts on the positive measured voltage. Then, the scale value "1" corresponds to a measured voltage $U_M$ of 0 volts to 10 volts etc. The second possibility of shifting the zero point is to include an additional resistor $R_o$ shown by dashed lines in FIG. 1 in the resistor series. The resistor $R_o$ must be so dimensioned that across it a voltage drop occurs which would correspond with the desired zero shift.

The table also takes into account the fact that the optical properties of the liquid crystal LC do not change abruptly when the voltage threshold is exceeded only slightly. This fact is expressed by the unequal signs. The relationship between the measured voltage and the scale reading is thus ambiguous for certain values of the measured voltage.

Figure 3:
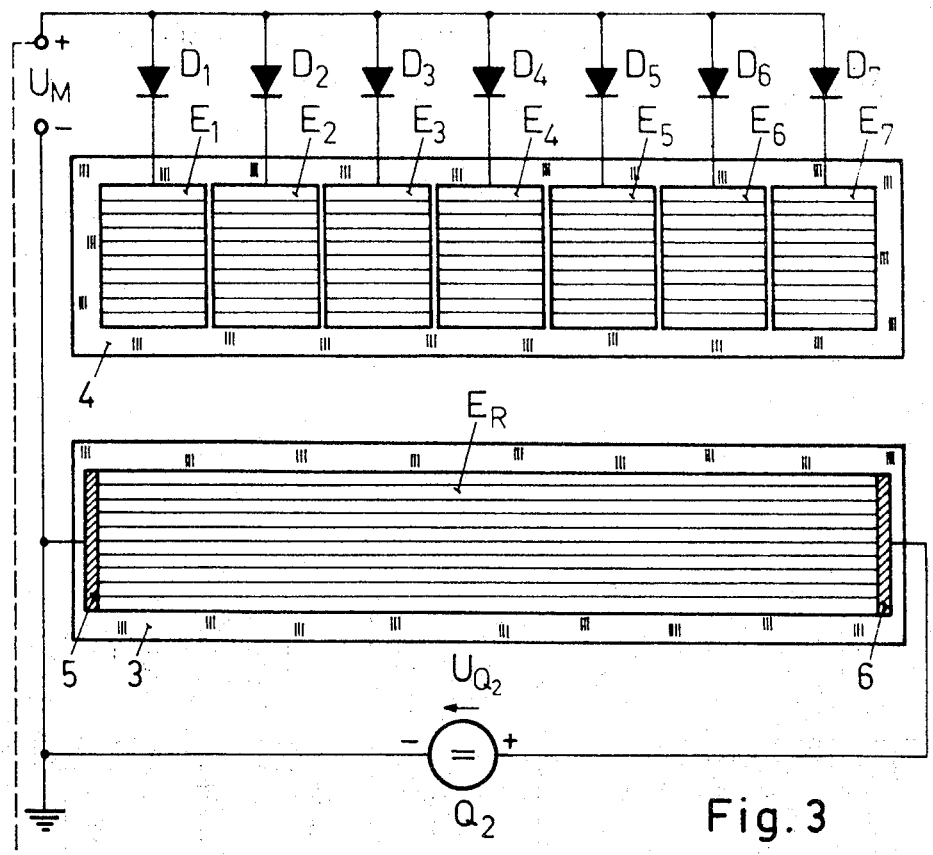
FIG. 3 is a top view of a modified version of the indicating element of FIG. 1.

A second advantageous embodiment of the invention is illustrated by way of example in FIG. 3. This figure shows, for the sake of clarity, the electrode covered glass plates 3 and 4 which are actually forming a sandwich type cell. The equipotential electrode $E_{eq}$ of FIG. 1 has been replaced in FIG. 3 by a resistive electrode $E_R$ provided with a homogeneous surface resistance layer. The series connected resistors $R_1$, $R_2$ etc. which are used in FIG. 1 to produce the potential gradient (FIG. 2), are not necessary in the embodiment of FIG. 3.

All the diodes $D_1, \ldots D_7$ assigned to the electrode elements $E_1, \ldots E_7$, are connected with their anodes to a common terminal. The cathodes of the diodes are individually connected to the respective electrode elements $D_1$ to $E_1$, $D_2$ to $E_2$, etc. The electrode elements are produced by vaporizing metal or metal oxide onto the glass plate 4 and are electrically insulated from one another. The resistive electrode $E_R$ is comprised, for example, of a tin dioxide layer vaporized onto a substrate and its narrower edges are provided with metal connection electrodes 5, 6. The surface resistance of the resistive electrode is constant throughout and will typically be in the range between 10 and 100 kOhm. One of the two electrodes, either the resistive electrode $E_R$ or all the electrode elements $E_1$ to $E_7$ are light transparent.

In order to produce a steady potential gradient along the resistive electrode $E_R$ a d.c. voltage source $Q_2$ is connected with its positive pole to the terminal 6 and with its negative pole to the terminal 5. The voltage $U_M$ to be measured is applied between the terminal 5 and the common terminal of the diodes $D_1$ to $D_7$. The mode of operation of the above described arrangement corresponds essentially to that of the first example. However, in FIG. 3 the indication is now analog i.e. the length of the scatter zone or of the bar depends continuously upon the applied voltage to be measured. The polarities of the voltages and of the diodes shown in FIG. 3 result in a scatter zone which increases from left to right in response to an increase of the measured voltage $U_M$. If the polarities of the diodes are reversed, then the scatter zone commences at the righthand side.

An arrangement which is even more advantageous then that shown in FIG. 3 is the one in which the resistive electrode $E_R$ is constructed in segments. This is illustrated by way of example in FIG. 4.

Figure 4:
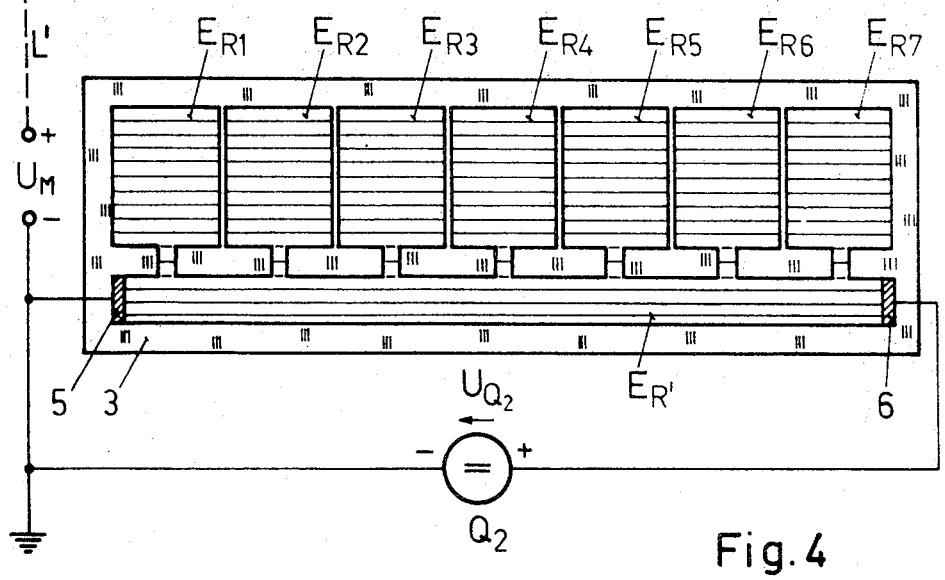
FIG. 4 is a top view of a particularly advantageous embodiment of the electrode carrying the potential gradient.

The resistive electrode which carries the potential gradient is marked $E_R'$ in FIG. 4. This electrode is connected through regularly arranged narrow bridges or taps to electrode segments $E_{R1}, \ldots E_{R7}$. The geometric form of these electrodes corresponds to that of the electrode elements $E_1, \ldots E_7$ arranged on the glass plate 4. When assembled, the electrode elements $E_1, \ldots$ and the electrode segments $E_{R1}$ are arranged in alignment or register relative to each other. The interconnection between the thus segmented electrode $E_R$ and the electrode comprising the electrode elements $E_1, \ldots$ is indicated by the dashed connecting line $L'$ between FIG. 3 and FIG. 4.

Arranging the resistive electrode in segments makes it possible to achieve a sharper transition between transparent and scatter zones than can be achieved by a resistive electrode coated with a continuous resistive coating.

The resistive electrode $E_R'$ (FIG. 4) carrying the potential gradient may be equally well replaced by a resistor series made up of discrete resistors (not shown). To this end the junction between individual resistors in the series and their ends would have to be directly connected to the electrode segments $E_{R1}, \ldots E_{R7}$. In both cases, the surface resistance of the electrode segments must remain such that the current which flows through them via the indicating medium does not distort the desired potential gradient. If both of the mutually opposite electrodes are subdivided as shown, then it is possible to select the number of diodes and the respective electrode elements so that this number differs from the number of potential steps. The number of potential steps corresponds to the number of electrode segments of $E_R$. The minimum number of diodes $n_D$ is determined from the relationship:

$$n_D = U_{Q2}/2U_T$$

where $U_{Q2}$ is the voltage of the d.c. voltage source $Q_2$ and $U_T$ is the threshold voltage of the indicating medium LC.

Figure 5:
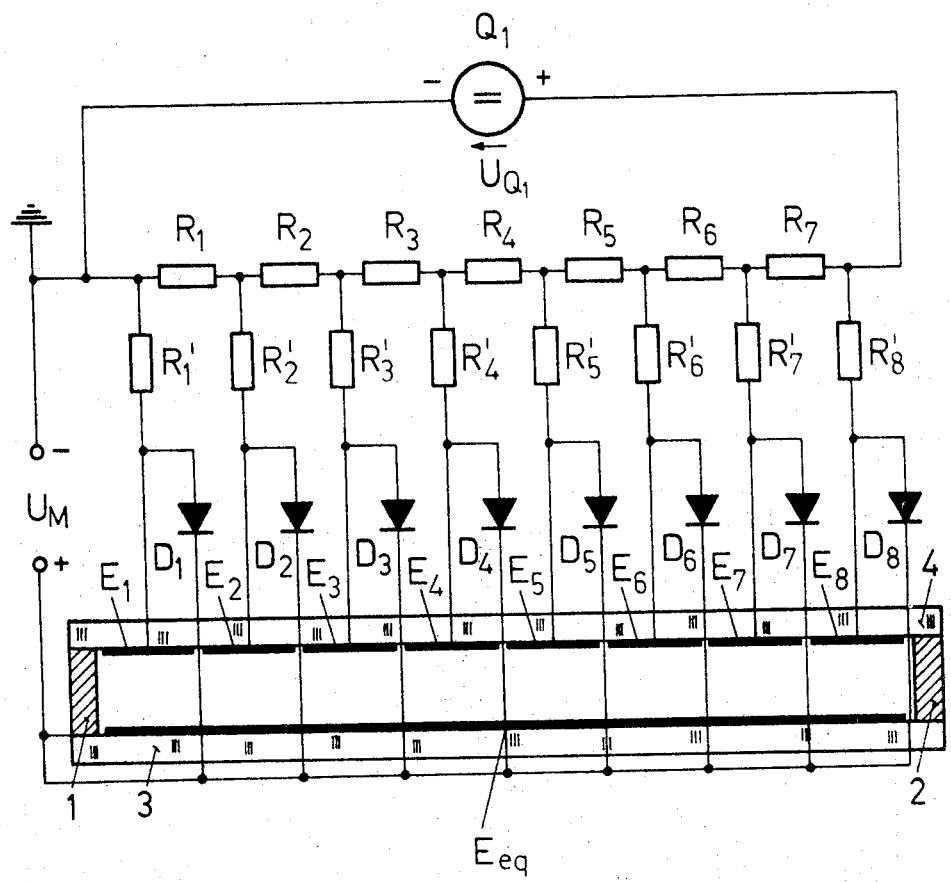
FIG. 5 shows a sectional view of a second embodiment of an indicating element in accordance with the invention.

A further advantageous modification of the embodiment in accordance with the invention as shown in FIG. 1 is obtained by connecting the diodes allocated to the electrode elements $E_1, \ldots$ in parallel to the indicating medium LC rather than in series therewith. This is illustrated by way of example, in FIG. 5. In addition, in this arrangement resistors $R_1', \ldots R_8'$ are connected in series with the diodes for limiting the current through the diodes so that the voltage divider is not short-circuited. These features may also be implemented in the arrangements shown in FIGS. 3 and 4. The parallel connection of the diodes and the liquid crystal LC has the advantage that no particular stringent requirements have to be imposed with regard to the reverse currents of the diodes.

In the above described examples, the indicating medium was assumed to be a nematic liquid crystal exhibiting a dynamic scattering effect, see "Scientific American," April, 70, p. 100. However, the invention is not limited to liquid crystals of this kind. Other liquid crystals and even solid substances can be used as the indicating medium, provided that their optical properties, as for example contrast, refraction, polarization, color, etc. change as a function of the absolute value of the applied voltage after achieving a predetermined threshold (same behaviour for both polarities). Thus, it is intended to cover, all modifications and equivalents within the scope of the appended claims.

We claim:

1. In an arrangement for locally modifying the optical properties of an indicating medium sandwiched between first and second electrodes, wherein a control voltage is applied across said electrodes, the improvement wherein at least one of said electrodes is in the form of a plurality of separate electrode members, a plurality of rectifier means, means for producing a potential gradient along said first electrode, and means for individually connecting said rectifier means to said electrode members with like polarity for substantially blocking current between the respective electrode member and the other electrode, at least one rectifier means being allocated to each electrode member.

2. The arrangement according to claim 1, wherein said means providing a potential gradient comprises means applying different potentials to said electrode members.

3. The arrangement according to claim 1, comprising one electrode which includes $n$-electrode members, a voltage source, a series connection of resistor means comprising a chain of $n-1$ resistors with junction points between adjacent resistors, and with first and second end terminals, means for connecting said voltage source to said end terminals in parallel to said resistor chain, said rectifier means comprising a plurality of rectifier elements, means for connecting one end of said rectifier elements in the same polarity sense to said junction points and to said end terminals and the opposite end to a respective one of said electrode members whereby each electrode member is connected to said resistor chain through its respective rectifier element, a further electrode for establishing an equipotential plane, said further electrode being arranged opposite and in register with said one electrode, input terminals, and means for connecting one of said input terminals to said further electrode and another input terminal to said first end terminal of said resistor chain.

4. The arrangement according to claim 1, wherein said means for providing a potential gradient comprises a resistive layer having a surface resistance of 10 to 100k Ohms on said first electrode, and wherein the second electrode which is located opposite said first electrode is subdivided to comprise $n$-electrode members.

5. The arrangement according to claim 4, further comprising first and second contact means arranged at two opposite sides of said potential gradient providing electrode, a d.c. voltage source, means for connecting said contact means to said d.c. voltage source, $n$-diodes, means for connecting the cathodes of said diodes to said $n$-electrode members, means for connecting the anodes of all of said diodes together to form a common terminal representing an input terminal, said first contact means representing another input terminal to which one side of said potential gradient providing electrode is connected.

6. The arrangement according to claim 5, wherein said potential gradient providing electrode has such a shape that between said contact means a staircase potential gradient is obtained.

7. The arrangement as claimed in claim 1, wherein one of said two electrodes comprises a plurality of $n$-electrode members, said arrangement further comprising a voltage source, a series connection of $n$-resistors with first and second end terminals and junctions between adjacent resistors, means for connecting said voltage source to said first and second end terminals, further resistor means for connecting said n-electrode members individually to a respective point along said series connection of $n$-resistors, a plurality of diodes, means for connecting each of said $n$-electrodes to a respective one of said diodes in equal polarity sense, means for further connecting said diodes to the other of said two electrodes which acts as an equipotential electrode, and input terminal means connected to said first end terminal of said resistor series connection and to said equipotential electrode.

8. In an apparatus for locally modifying the optical properties of a liquid crystal layer sandwiched between a pair of electrodes, including a source of control potential, means applying said control potential between said electrodes, and means for producing a potential gradient along one of said electrodes; the improvement wherein one of said electrodes is separated to form a plurality of separate electrode segments, and further comprising a separate rectifier for each segment and having one electrode connected to the respective segment, each of said rectifiers being connected with the same polarity, and means connectng the other electrodes of said rectifiers to substantially inhibit the application of potentials of one polarity between the respective segment and the other electrode.

* * * * *